US012191072B2

(12) United States Patent
Itani et al.

(10) Patent No.: US 12,191,072 B2
(45) Date of Patent: Jan. 7, 2025

(54) COIL COMPONENT MANUFACTURING APPARATUS AND COIL COMPONENT MANUFACTURING METHOD

(71) Applicant: Murata Manufacturing Co., Ltd., Kyoto-fu (JP)

(72) Inventors: Yasuhiro Itani, Nagaokakyo (JP); Ryo Narahara, Nagaokakyo (JP); Seiji Karimori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 303 days.

(21) Appl. No.: 17/745,675

(22) Filed: May 16, 2022

(65) Prior Publication Data

US 2022/0367113 A1 Nov. 17, 2022

(30) Foreign Application Priority Data

May 17, 2021 (JP) ................................ 2021-083359

(51) Int. Cl.
*H01F 41/00* (2006.01)
*H01F 41/07* (2016.01)
*H01F 41/082* (2016.01)

(52) U.S. Cl.
CPC ........... *H01F 41/082* (2016.01); *H01F 41/07* (2016.01)

(58) Field of Classification Search
CPC ......... H01F 41/082; H01F 41/06; H01F 41/07
See application file for complete search history.

(56) References Cited

U.S. PATENT DOCUMENTS

2016/0351329 A1* 12/2016 Kanno .................... H01F 41/07
2016/0379756 A1* 12/2016 Yamakita .............. H01F 41/069 242/439.1
2017/0069425 A1* 3/2017 Yamakita ................ H01F 41/07

FOREIGN PATENT DOCUMENTS

| | | | | |
|---|---|---|---|---|
| CN | 107993838 A | 5/2018 | | |
| JP | H05-258984 A | 10/1993 | | |
| JP | H10-144553 A | 5/1998 | | |
| JP | 2009-246177 A | 10/2009 | | |
| JP | 2010-147132 A | 7/2010 | | |
| JP | 2018-093125 A | 6/2018 | | |
| JP | 2020107861 A | * | 7/2020 | ........... H01F 17/045 |
| WO | WO-2015178165 A1 | * | 11/2015 | ........... B65H 54/026 |

* cited by examiner

*Primary Examiner* — Emmanuel M Marcelo
(74) *Attorney, Agent, or Firm* — Studebaker & Brackett PC

(57) ABSTRACT

A coil component manufacturing apparatus for winding a twisted portion of wires at a desired position of a core. A coil component manufacturing apparatus including a nozzle through which a plurality of wires can be inserted, a wire twisting mechanism that holds a core, rotates the core relative to the nozzle in a direction of twisting the wires, and forms a twisted portion in which the wires are twisted between the nozzle and the core, a wire winding mechanism that holds the core, rotates the core relative to the nozzle in a direction of winding the twisted portion is wound around the core, and winds the twisted portion around the core, and a guide member positioned closer to the core than the nozzle. The guide member guides the twisted portion to a predetermined position of the core when the twisted portion is wound around the core.

20 Claims, 10 Drawing Sheets

COIL COMPONENT MANUFACTURING APPARATUS AND COIL COMPONENT MANUFACTURING METHOD

CROSS-REFERENCE TO RELATED APPLICATION

This application claims benefit of priority to Japanese Patent Application No. 2021-083359, filed May 17, 2021, the entire content of which is incorporated herein by reference.

BACKGROUND

Technical Field

The present disclosure relates to a coil component manufacturing apparatus and a coil component manufacturing method.

Background Art

Conventionally, as a coil component manufacturing method, there is a method described in Japanese Patent Application Laid-Open No. 2010-147132. The coil component manufacturing method includes a first step of passing a plurality of wires through a nozzle to connect tips of the wires to an external electrode portion of a core, a second step of rotating the nozzle a predetermined number of times to form a twisted portion of the wires between the nozzle and the core, and a third step of rotating the core to wind the twisted portion of the wires around the core.

SUMMARY

In the coil component manufacturing method, more wires may be wound around the core at one time to reduce the number of steps. In this case, the twisted portion is formed at one time with longer wires. That is, the twisted portion is formed between the nozzle and the core by separating the nozzle and the core as much as possible and making the wire between the nozzle and the core longer.

However, since the nozzle and the core are separated from each other, when the twisted portion of the wires is wound around the core in this state, it is difficult to wind the twisted portion of the wires at a desired position of the core. In particular, when the distance from the nozzle to the core is long, it is difficult to wind the twisted portion of the wires around the core with high positional accuracy.

Therefore, the present disclosure provides a coil component manufacturing apparatus and coil component manufacturing method capable of winding a twisted portion of wires at a desired position of a core.

The coil component manufacturing apparatus, which is an aspect of the present disclosure, includes a nozzle through which a plurality of wires are capable of being inserted; a wire twisting mechanism that holds a core, rotates the core relative to the nozzle in a direction of twisting the plurality of wires, and is capable of forming a twisted portion in which the plurality of wires are twisted between the nozzle and the core; a wire winding mechanism that holds the core, rotates the core relative to the nozzle in a direction of winding the twisted portion around the core, and is capable of winding the twisted portion around the core; and a guide member positioned closer to the core than the nozzle, the guide member being capable of guiding the twisted portion to a predetermined position of the core when the twisted portion is wound around the core.

Here, the predetermined position of the core is a position necessary for spirally winding the twisted portion along the axial direction in the circumferential direction of the core.

According to the above aspect, since the twisted portion is wound around the core while being guided to a predetermined position of the core by the guide member positioned closer to the core than the nozzle, the twisted portion can be wound at a desired position of the core.

Preferably, the guide member is positioned between the nozzle and the core when the twisted portion is wound around the core.

According to the above embodiment, the guide member can guide the twisted portion to the core while being at a position where it is difficult to apply a load to the wire.

Preferably, in an embodiment of the coil component manufacturing apparatus, the guide member has a groove having a V-shaped section through which the twisted portion passes.

Here, the V shape refers to a shape in which the width decreases from the opening of the groove toward the bottom of the groove, and is not limited to a perfect V shape, and may be a substantial V shape such as a trapezoid in which the bottom of the groove is flat.

According to the above embodiment, since the guide member has the groove having a V-shaped section, the twisted portion can be wound around the core while being positioned in the groove of the guide member. This can further improve the positional accuracy of winding of the twisted portion around the core.

Preferably, in an embodiment of the coil component manufacturing apparatus, the guide member has a cylindrical body, and the groove extends in a circumferential direction on a side face of the cylindrical body.

According to the above embodiment, since the groove extends in the circumferential direction on the side face of the cylindrical body, the twisted portion is guided along the circumferential direction on the side face of the cylindrical body. This can smoothly guide the twisted portion to the core without applying an excessive load to the twisted portion.

Preferably, in an embodiment of the coil component manufacturing apparatus, the guide member is rotatably held about an axis of the cylindrical body.

According to the above embodiment, the guide member, which is rotatably held, guides the twisted portion to the core while rotating. This can reduce the resistance of the guide member to the twisted portion and more smoothly guide the twisted portion to the core.

Preferably, in an embodiment of the coil component manufacturing apparatus, the apparatus further includes a guide driving mechanism that is capable of moving the guide member in an axial direction of the core when the twisted portion is wound along the axial direction of the core.

According to the above embodiment, since the guide driving mechanism is further provided, the twisted portion can be wound around the core with the guide member being aligned with a desired position of the core. This can further improve the positional accuracy of winding of the twisted portion around the core.

Preferably, in an embodiment of the coil component manufacturing apparatus, two guide members are present, and the two guide members are positioned on opposite sides of the twisted portion when the twisted portion is wound around the core, and are capable of guiding the twisted portion to a predetermined position of the core.

According to the above embodiment, since the two guide members are positioned on the opposite sides of the twisted portion and guide the twisted portion to the predetermined position of the core, the positional accuracy of the winding of the twisted portion with respect to the core can be further improved.

Preferably, in an embodiment of the coil component manufacturing apparatus, the apparatus further includes a nozzle height adjustment mechanism that is capable of relatively adjusting a distance between the nozzle and the core.

According to the above embodiment, when the twisted portion is formed and/or when the twisted portion is wound around the core, the distance between the nozzle and the core can be adjusted according to the size of the product. In addition, the twist pitch of the twisted portion can be adjusted by adjusting the distance between the nozzle and the core when the twisted portion is formed.

Preferably, in an embodiment of the coil component manufacturing apparatus, the nozzle includes a plurality of nozzle portions through which the plurality of wires are capable of being respectively inserted, and the apparatus further includes an inter-nozzle distance adjustment mechanism that is capable of adjusting a distance between the plurality of nozzle portions.

According to the above embodiment, the twist pitch of the twisted portion can be adjusted by adjusting the distance between the plurality of nozzle portions when the twisted portion is formed.

A coil component manufacturing method which is an aspect of the present disclosure includes the steps of passing a plurality of wires through a nozzle to connect starting ends of the plurality of wires to an external electrode of a core; relatively rotating the nozzle and the core in a direction of twisting the plurality of wires and forming a twisted portion in which the plurality of wires are twisted between the nozzle and the core; and relatively rotating the nozzle and the core in a direction of winding the twisted portion around the core and winding the twisted portion around the core while guiding the twisted portion to a predetermined position of the core with a guide member positioned closer to the core than the nozzle.

According to the above aspect, since the twisted portion is wound around the core while being guided to a predetermined position of the core by the guide member positioned closer to the core than the nozzle, the twisted portion can be wound at a desired position of the core.

Preferably, in an embodiment of the coil component manufacturing method, in the step of winding the twisted portion around the core, the twisted portion is guided to the predetermined position of the core while the guide member is rotated about an axis of the guide member.

According to the above embodiment, since the twisted portion is guided to the core while the guide member is rotated, the resistance of the guide member to the twisted portion can be reduced, and the twisted portion can be more smoothly guided to the core.

Preferably, in an embodiment of the coil component manufacturing method, in the step of winding the twisted portion around the core, the guide member is moved in an axial direction of the core to guide the twisted portion to the predetermined position of the core.

According to the above embodiment, since the guide member is moved in the axial direction of the core to guide the twisted portion to a predetermined position of the core, the twisted portion can be wound around the core with the guide member being aligned with a desired position of the core. This can further improve the positional accuracy of winding of the twisted portion around the core.

Preferably, in an embodiment of the coil component manufacturing method, two guide members are present, and in the step of winding the twisted portion around the core, the twisted portion is guided to the predetermined position of the core with the two guide members positioned on opposite sides of the twisted portion.

According to the above embodiment, since the twisted portion is guided to a predetermined position of the core by the two guide members positioned on the opposite sides of the twisted portion, the positional accuracy of winding of the twisted portion around the core can be further improved.

Preferably, in an embodiment of the coil component manufacturing apparatus, a distance between the nozzle and the core is relatively adjusted in at least one of the step of forming the twisted portion or the step of winding the twisted portion around the core.

According to the above embodiment, in at least one of the step of forming the twisted portion or the step of winding the twisted portion around the core, the distance between the nozzle and the core can be adjusted in accordance with the size of the product. In addition, the twist pitch of the twisted portion can be adjusted by adjusting the distance between the nozzle and the core in the step of forming the twisted portion.

Preferably, in an embodiment of the coil component manufacturing method, the nozzle includes a plurality of nozzle portions through which the plurality of wires are capable of being respectively inserted, and in the step of forming the twisted portion, a distance between the plurality of nozzle portions is adjusted.

According to the above embodiment, the twist pitch of the twisted portion can be adjusted by adjusting the distance between the plurality of nozzle portions in the step of forming the twisted portion.

According to the coil component manufacturing apparatus and the coil component manufacturing method as one aspect of the present disclosure, the twisted portion of the wires can be wound at a desired position of the core.

DETAILED DESCRIPTION

Hereinafter, a coil component manufacturing apparatus and a coil component manufacturing method as one aspect of the present disclosure will be described in detail with reference to the illustrated embodiments. Note that the drawings include some schematic drawings and do not reflect actual dimensions or ratios in some case.

First Embodiment

Figure 1:
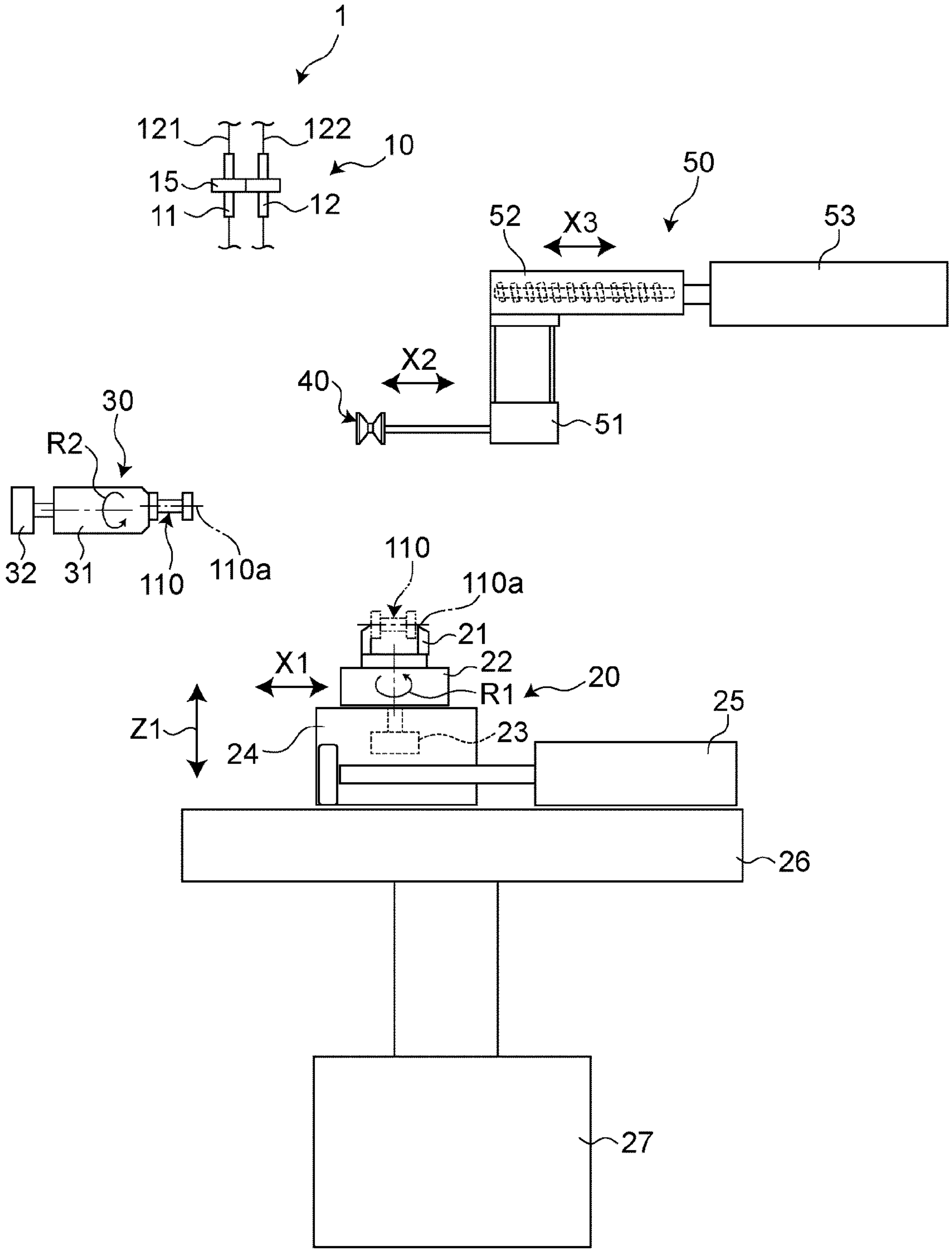
FIG. 1 is a simplified configuration diagram illustrating a first embodiment of a coil component manufacturing apparatus.

FIG. 1 is a simplified configuration diagram illustrating a first embodiment of a coil component manufacturing apparatus. As illustrated in FIG. 1, a coil component manufacturing apparatus 1 includes a nozzle 10 through which a first wire 121 and a second wire 122 are capable of being inserted, a wire twisting mechanism 20 that is capable of forming a twisted portion in which the first wire 121 and the second wire 122 are twisted, a wire winding mechanism 30 that is capable of winding the twisted portion around a core 110, a guide member 40 that is capable of guiding the twisted portion to a predetermined position of the core 110 when the twisted portion is wound around the core 110, and a guide driving mechanism 50 that is capable of moving the guide member 40 in a direction of an axis 110*a* of the core 110 when the twisted portion is wound along the direction of the axis 110*a* of the core 110. A coil component can be manufactured using the coil component manufacturing apparatus 1.

Figure 2:
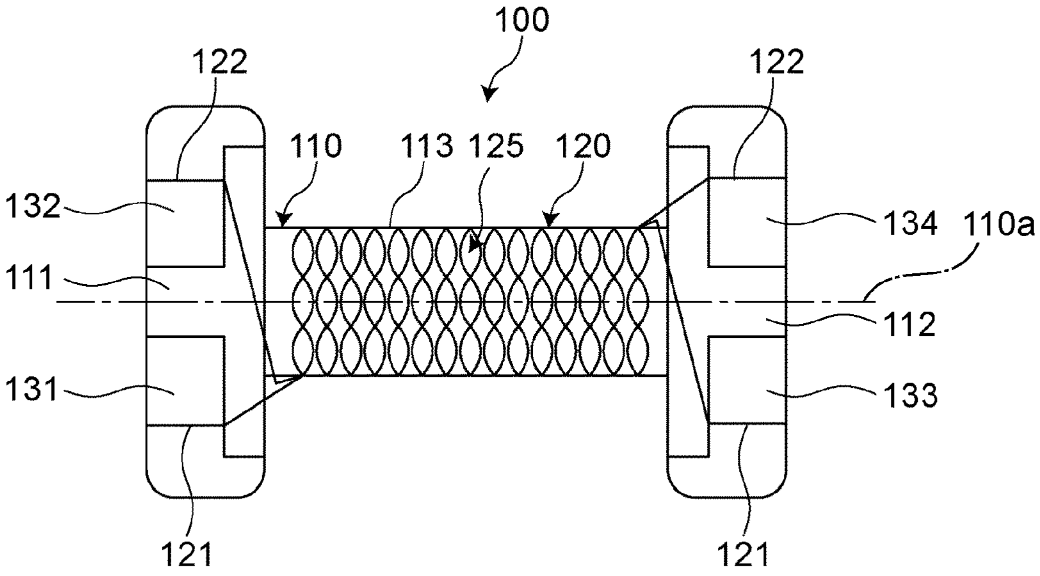
FIG. 2 is a bottom view of a coil component.

Here, the coil component will be described. FIG. 2 is a bottom view of the coil component. As illustrated in FIG. 2, a coil component 100 includes a core 110, a coil 120 wound around the core 110, and a first external electrode 131, a second external electrode 132, a third external electrode 133, and a fourth external electrode 134 provided in the core 110 and electrically connected to the coil 120.

The core 110 includes a winding core portion 113, a first flange portion 111 provided at a first end of the winding core portion 113, and a second flange portion 112 provided at a second end of the winding core portion 113. As a material of the core 110, for example, a magnetic body such as a sintered body of ferrite or a molded body of a magnetic powder-containing resin is preferable, and a non-magnetic body such as alumina or a resin may be used.

The shape of the winding core portion 113 is, for example, a rectangular parallelepiped. The sectional shape orthogonal to the axis 110*a* of the winding core portion 113 may be a shape including a curved face such as a circle, or may be a polygon such as a hexagon or an octagon.

The shape of the first flange portion 111 and the shape of the second flange portion 112 are, for example, rectangular flat plates. The first external electrode 131 and the second external electrode 132 are provided on the bottom face of the first flange portion 111, and the third external electrode 133 and the fourth external electrode 134 are provided on the bottom face of the second flange portion 112. The first to fourth external electrodes 131 to 134 are made of, for example, conductive material such as silver. The first to fourth external electrodes 131 to 134 are electrically connected to electrodes of a mounting substrate (not illustrated).

The coil 120 includes the first wire 121 and the second wire 122 wound around the winding core portion 113. That is, the first wire 121 and the second wire 122 are wound around the core 110 along the axis 110*a* (the extending direction of the winding core portion 13) of the core 110.

Each of the first wire 121 and the second wire 122 is a conductive wire with an insulating coating in which a conductive wire made of metal such as copper is covered with a coating made of resin such as polyurethane or polyamideimide. The first wire 121 has a first end electrically connected to the first external electrode 131 and a second end electrically connected to the third external electrode 133. The second wire 122 has a first end electrically connected to the second external electrode 132 and a second end electrically connected to the fourth external electrode 134. The first wire 121 and the second wire 122 are connected to the first to fourth external electrodes 131 to 134 by, for example, thermal pressure bonding, brazing, welding, or the like.

The first wire 121 and the second wire 122 are wound in the same direction with respect to the winding core portion 113. As a result, in the coil component 100, when signals in opposite phase such as differential signaling are input to the first wire 121 and the second wire 122, the magnetic fluxes generated by the first wire 121 and the second wire 122 cancel each other out, the function as an inductor is weakened, and the signal is allowed to pass. When signals in a same phase such as external noise is input to the first wire 121 and the second wire 122, the magnetic fluxes generated by the first wire 121 and the second wire 122 intensify each other, the function as an inductor is enhanced, and the passage of the noise is blocked. Therefore, the coil component 100 functions as a common mode choke coil that attenuates a common mode signal such as external noise while reducing a passage loss of a differential mode signal such as differential signaling.

The first wire 121 and the second wire 122 are twisted with each other to form a twisted portion 125. The twisted portion 125 is present in the region of the winding core portion 113, but may be present in at least one of the region between the first flange portion 111 and the winding core portion 113 and the region between the second flange portion 112 and the winding core portion 113. In the twisted portion 125, since a relative difference (line length, stray capacitance bias, etc.) between the two wires is reduced, a mode conversion output, for example, an output of signal converted from a differential mode signal into a common mode signal or an output of signal conversely converted in the coil component 100 is reduced, and a mode conversion characteristic can be improved.

As illustrated in FIG. 1, in the coil component manufacturing apparatus 1, the nozzle 10 is disposed above the wire twisting mechanism 20 in a vertical direction. The wire winding mechanism 30 and the guide member 40 are disposed between the nozzle 10 and the wire twisting mechanism 20 in the vertical direction. Here, “above” refers to the upper side in the direction of gravity when the manufacturing apparatus 1 is installed on the ground.

The nozzle 10 includes a first nozzle portion 11 through which the first wire 121 is capable of being inserted, a second nozzle portion 12 through which the second wire 122 is capable of being inserted, and a support plate 15 that supports the first nozzle portion 11 and the second nozzle portion 12. The first nozzle portion 11 and the second nozzle portion 12 are integrally connected by the support plate 15.

The wire twisting mechanism 20 holds the core 110, rotates the core 110 relative to the nozzle 10 in a direction of twisting the first and second wires 121, 122, and is capable of forming the twisted portion 125 between the nozzle 10 and the core 110.

The wire twisting mechanism 20 includes a twisting chuck portion 21 that holds the core 110, a rotation table 22 that supports and fixes the twisting chuck portion 21, a motor 23 that rotates the rotation table 22 about a vertical axis, a support table 24 that rotatably supports the rotation table 22, a first cylinder 25 that reciprocates the support table 24 in a horizontal direction, a base 26 that supports the support table 24 in a reciprocating manner, and a second cylinder 27 that reciprocates the base 26 in the vertical direction.

The twisting chuck portion 21 rotates in an R1 direction about the vertical axis together with the rotation table 22 when the motor 23 is driven. The core 110 held by the winding chuck portion 21 rotates in the R1 direction about the vertical axis orthogonal to the axis 110*a* of the core 110 and passing through the center of the core 110 when the motor 23 is driven.

The twisting chuck portion 21 and the rotation table 22 reciprocate in the horizontal direction together with the support table 24 when the first cylinder 25 is driven. That is, the twisting chuck portion 21 reciprocates in the left-right direction (X1 direction) when the first cylinder 25 is driven, and approaches or separates from the wire winding mechanism 30.

The twisting chuck portion 21, the rotation table 22, and the support table 24 reciprocate in the vertical direction together with the base 26 when the second cylinder 27 is driven. That is, the twisting chuck portion 21 reciprocates in the vertical direction (Z1 direction) when the second cylinder 27 is driven, and approaches or separates from the wire winding mechanism 30.

The wire winding mechanism 30 holds the core 110, rotates the core 110 relative to the nozzle 10 in a direction of winding the twisted portion 125 around the core 110, and is capable of winding the twisted portion 125 around the core 110.

The wire winding mechanism 30 includes a winding chuck portion 31 that holds the core 110 and a motor 32 that rotates the winding chuck portion 31 about a horizontal axis. The core 110 held by the winding chuck portion 31 rotates in an R2 direction about the axis 110*a* of the core 110 coinciding with the horizontal axis when the motor 32 is driven. The core 110 is selectively held by the twisting chuck portion 21 or the winding chuck portion 31. FIG. 1 illustrates a state in which the core 110 is held by the winding chuck portion 31.

The guide driving mechanism 50 allows the guide member 40 to move in the direction of the axis 110*a* of the core 110 when the twisted portion 125 is wound around the core 110.

The guide driving mechanism 50 includes a guide support portion 51 that supports the guide member 40, a guide position adjusting portion 52 that reciprocates the guide support portion 51 in the horizontal direction, and a cylinder 53 that reciprocates the guide position adjusting portion 52 in the horizontal direction.

The guide position adjusting portion 52 has, for example, a ball screw, is screwed into the guide support portion 51, and moves the guide support portion 51 in the horizontal direction with the rotation of the ball screw. The guide member 40 reciprocates in the horizontal direction together with the guide support portion 51 when the guide position adjusting portion 52 is driven. That is, the guide member 40 reciprocates in the left-right direction (X2 direction) when the guide position adjusting portion 52 is driven, and approaches or separates from the wire winding mechanism 30.

The guide member 40 and the guide support portion 51 reciprocate in the horizontal direction together with the guide position adjusting portion 52 when the cylinder 53 is driven. That is, the guide member 40 reciprocates in the left-right direction (X3 direction) when the cylinder 53 is driven, and approaches or separates from the wire winding mechanism 30.

The guide member 40 is positioned closer to the core 110 held by the winding chuck portion 31 than the nozzle 10 and is capable of guiding the twisted portion 125 to a predetermined position of the core 110 when the twisted portion 125 is wound around the core 110.

Specifically, the guide member 40 is positioned between the nozzle 10 and the core 110 when the twisted portion 125 is wound around the core 110. That is, the guide member 40 is positioned on the wires 121, 122 between the nozzle 10 and the core 110. Preferably, the guide member 40 is positioned on a line segment connecting the nozzle 10 and the core 110. The guide member 40 is positioned between the nozzle 10 and the core 110 held by the winding chuck portion 31 in the vertical direction.

The guide member 40 does not have to be on a line segment connecting the nozzle 10 and the core 110. The guide member 40 does not have to be positioned between the nozzle 10 and the core 110 in the vertical direction and may be positioned at the same height as the core 110, for example.

The guide member 40 spirally winds the twisted portion 125 in the circumferential direction of the core 110 along the axial direction. In other words, the guide member 40 winds the twisted portion 125 in the circumferential direction of the core 110 with a slight shift in the direction of the axis 110*a* of the core 110. In this manner, the guide member 40 guides the twisted portion 125 to a position where the twisted portion 125 is wound around the core 110, and the guide member 40 is capable of moving in the direction of the axis 110*a* in accordance with the shift of the twisted portion 125 in the direction of the axis 110*a*.

According to the above configuration, since the twisted portion 125 is wound around the core 110 while being guided to a predetermined position of the core 110 by the guide member 40 positioned closer to the core 110 than the nozzle 10, the twisted portion 125 can be guided to the core 110 at a position close to the core 110, and as a result, the twisted portion 125 can be wound at a desired position of the core 110.

The guide member 40, which is positioned between the nozzle 10 and the core 110 when the twisted portion 125 is wound around the core 110, can guide the twisted portion 125 to the core 110 while being at a position where it is difficult to apply a load to the wires 121, 122.

In addition, since the guide driving mechanism 50 is further provided, the twisted portion 125 can be wound around the core 110 while the guide member 40 is moved to align with a desired position of the core 110. This can further improve the positional accuracy of winding of the twisted portion 125 around the core 110.

Figure 3A:
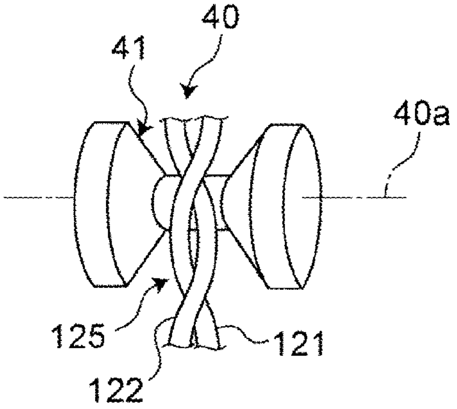
FIG. 3A is a perspective view of a guide member.
Figure 3B:
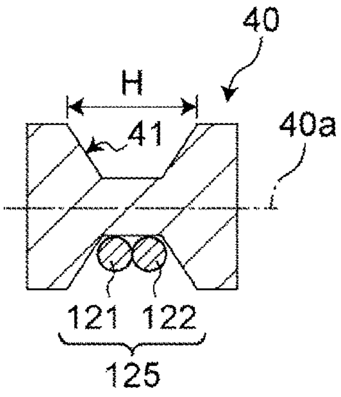
FIG. 3B is a sectional view including an axis of a guide member.

FIG. 3A is a perspective view of the guide member 40. FIG. 3B is a sectional view including an axis 40*a* of the guide member 40.

As illustrated in FIGS. 3A and 3B, the guide member 40 has a groove 41 having a V-shaped section through which the twisted portion 125 passes. The V shape refers to a shape in which a width H decreases from the opening of the groove 41 toward the bottom of the groove 41, is not limited to a perfect V shape, and may be a substantial V shape such as a trapezoid in which the bottom of the groove 41 is flat. In this embodiment, the bottom of the groove 41 is flat.

According to the above configuration, the twisted portion 125 can be wound around the core 110 while being positioned in the groove 41 having the V-shaped section. This can further improve the positional accuracy of winding of the twisted portion 125 around the core 110.

The guide member 40 is a cylindrical body, and the groove 41 extends in the circumferential direction on the side face of the cylindrical body. According to the above configuration, the twisted portion 125 is guided along the circumferential direction on the side face of the cylindrical body. This can smoothly guide the twisted portion 125 to the core 110 without applying an excessive load to the twisted portion 125.

The guide member 40 is rotatably held about the axis 40*a* of the cylindrical body. That is, the guide member 40 is rotatably supported about the axis 40*a* with respect to the guide support portion 51 illustrated in FIG. 1. According to the above configuration, the guide member 40 guides the twisted portion 125 to the core 110 while rotating. This can reduce the resistance of the guide member 40 to the twisted portion 125 and more smoothly guide the twisted portion 125 to the core 110.

Preferably, the width H on the opening side of the groove 41 is twice or more and three times or less (i.e., from twice to three times) the diameter of the wires 121, 122. When the width H is twice or more the diameter, the twisted portion 125 can be accommodated in the groove 41 in a state where the two wires 121, 122 are arranged in the lateral direction parallel to the axis 40*a*, the state having the maximum dimension in the twisted portion 125. On the other hand, when the width H is three times or less the diameter, when the twisted portion 125 accommodated in the groove 41 is wound around the winding core portion 113, a play in which the twisted portion 125 is movable in the groove 41 can be reduced, and as a result, the twisted portion 125 in the groove 41 can be wound at a desired position of the winding core portion 113.

Next, a coil component manufacturing method will be described.

Figure 4:
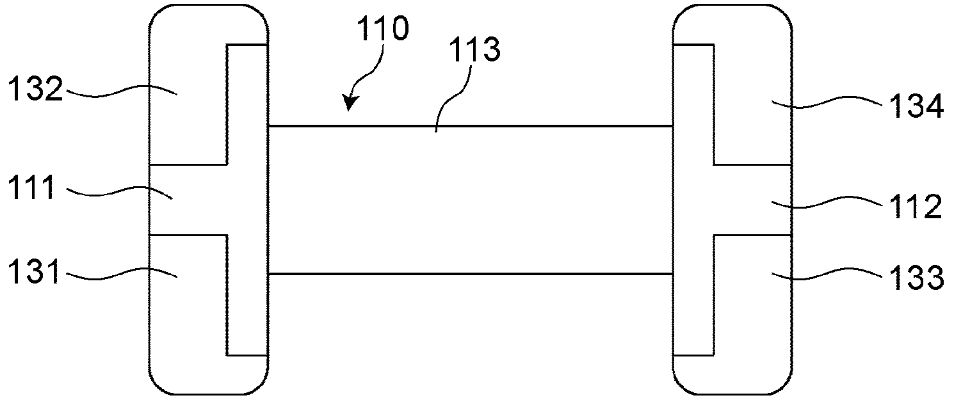
FIG. 4 is a bottom view of a core provided with an external electrode.

First, as illustrated in FIG. 4, the first external electrode 131 and the second external electrode 132 are provided on the bottom face of the first flange portion 111 of the core 110, and the third external electrode 133 and the fourth external electrode 134 are provided on the bottom face of the second flange portion 112 of the core 110.

Figure 5A:
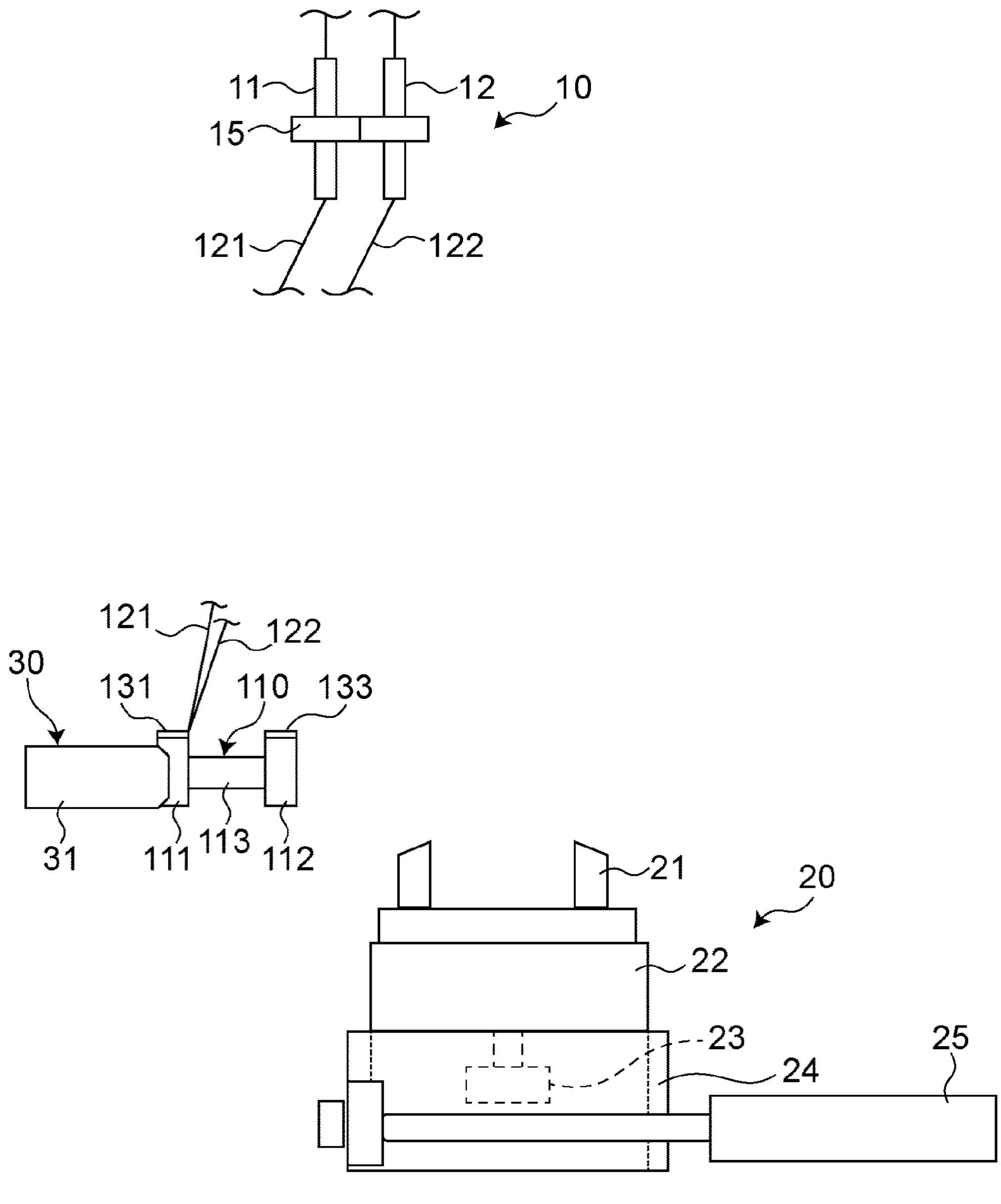
FIG. 5A is an explanatory view for explaining a coil component manufacturing method.

Then, as illustrated in FIG. 5A, the first flange portion 111 of the core 110 is held by the winding chuck portion 31. In addition, the wires 121, 122 are pulled out from bobbins (not illustrated), the first wire 121 is passed through the first nozzle portion 11, the second wire 122 is passed through the second nozzle portion 12, the starting end of the first wire 121 is connected to the first external electrode 131 of the core 110, and the starting end of the second wire 122 is connected to the second external electrode 132 of the core 110. For example, the starting ends of the wires 121, 122 are respectively pressure-bonded to the external electrodes 131, 132 using a heater chip. At this time, the twisting chuck portion 21 is positioned at a first position (retracted position).

Figure 5B:
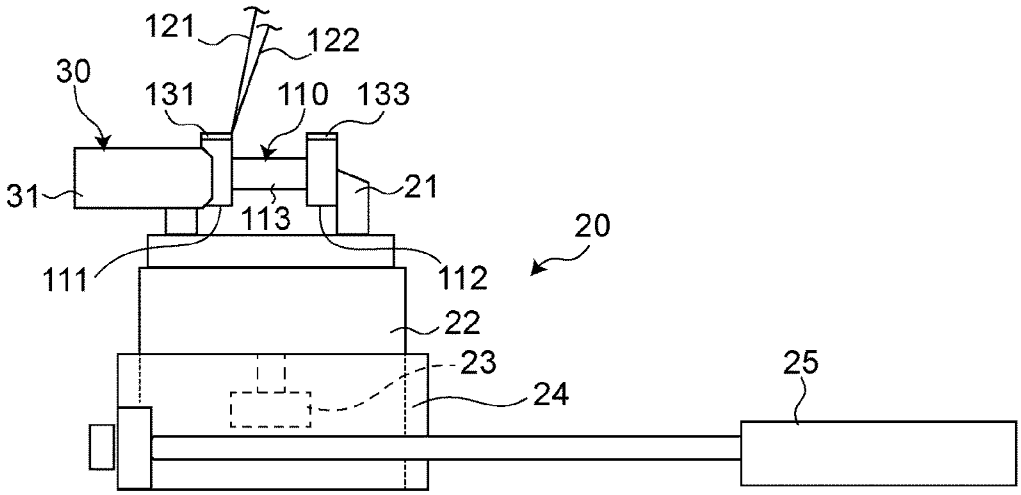
FIG. 5B is an explanatory view for explaining a coil component manufacturing method.

Thereafter, as illustrated in FIG. 5B, the rod of the first cylinder 25 is extended to bring the twisting chuck portion 21 close to the winding chuck portion 31 together with the rotation table 22 and the support table 24. Further, the rod of the second cylinder 27 illustrated in FIG. 1 is extended to bring the twisting chuck portion 21 close to the winding chuck portion 31 together with the rotation table 22, the support table 24, and the base 26. That is, the twisting chuck portion 21 is moved from the first position illustrated in FIG. 5A to a second position (core transfer position) illustrated in FIG. 5B. Then, the core 110 held by the winding chuck portion 31 is moved to the twisting chuck portion 21.

Figure 5C:
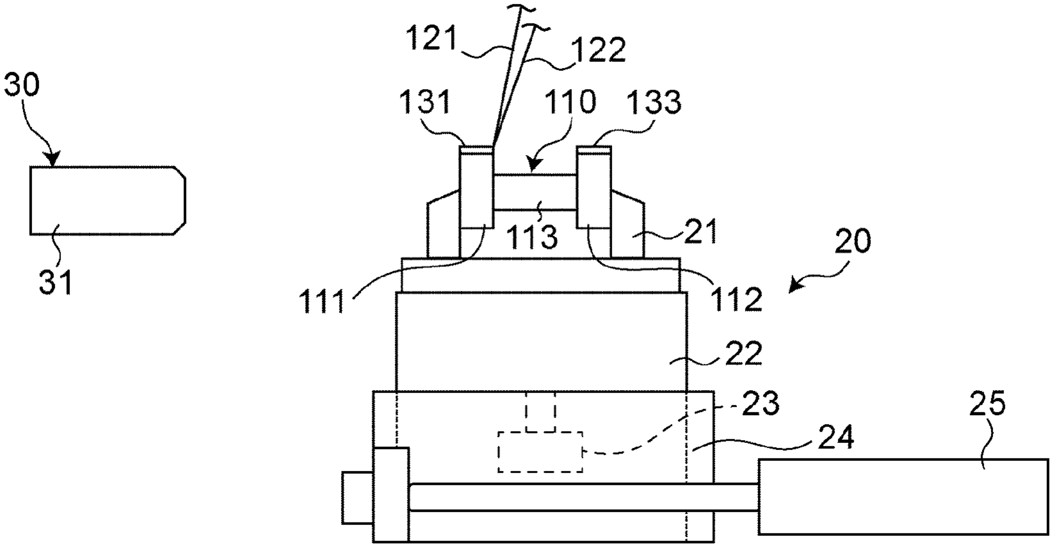
FIG. 5C is an explanatory view for explaining a coil component manufacturing method.

Thereafter, as illustrated in FIG. 5C, the rod of the first cylinder 25 is retracted to separate the twisting chuck portion 21 from the winding chuck portion 31 together with the rotation table 22 and the support table 24. At this time, the twisting chuck portion 21 is positioned at a third position (twisted portion forming position).

Figure 5D:
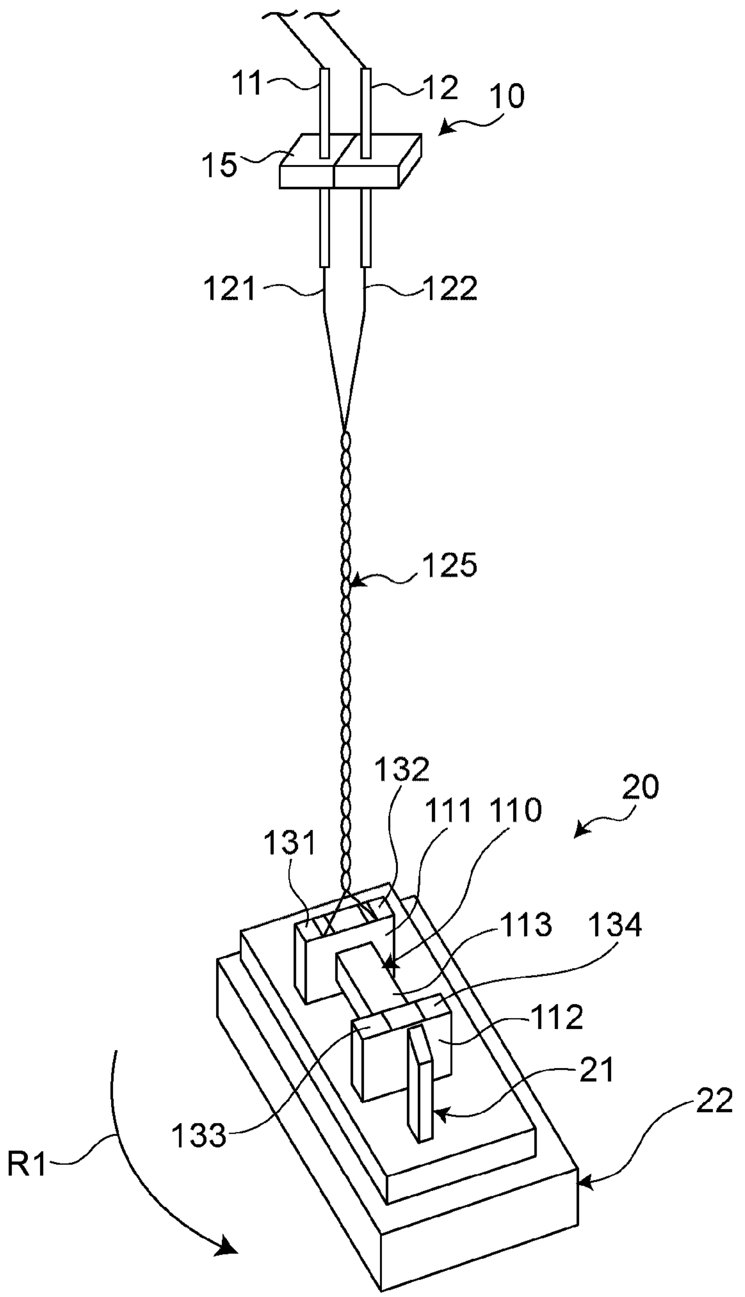
FIG. 5D is an explanatory view for explaining a coil component manufacturing method.

Then, as illustrated in FIG. 5D, the nozzle 10 and the core 110 are relatively rotated in the direction of twisting the two wires 121, 122, and the twisted portion 125 in which the two wires 121, 122 are twisted is formed between the nozzle 10 and the core 110. Specifically, the nozzle 10 is fixed, the rotation table 22 is rotated about the vertical axis when the motor 23 illustrated in FIG. 1 is driven, and the twisting chuck portion 21 (core 110) is rotated in the R1 direction.

The core 110 may be fixed and the nozzle 10 may be rotated about the core 110, the core 110 may be rotated and the nozzle 10 may be rotated in a direction opposite to the rotation of the core 110, or the core 110 may be rotated and the nozzle 10 may be rotated faster than the rotation of the core 110 in the same direction as the rotation of the core 110.

Figure 5E:
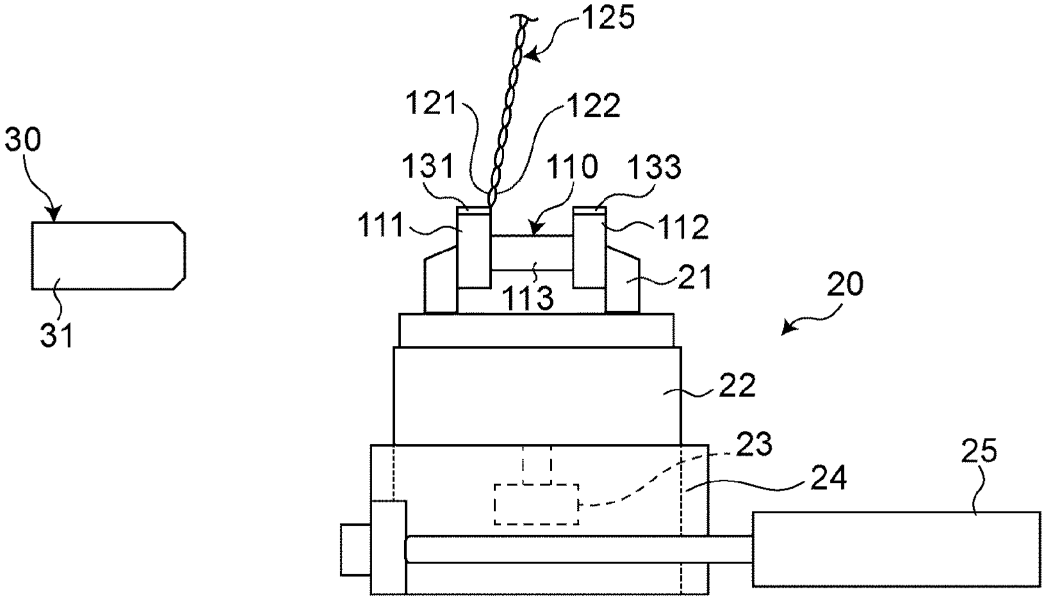
FIG. 5E is an explanatory view for explaining a coil component manufacturing method.
Figure 5F:
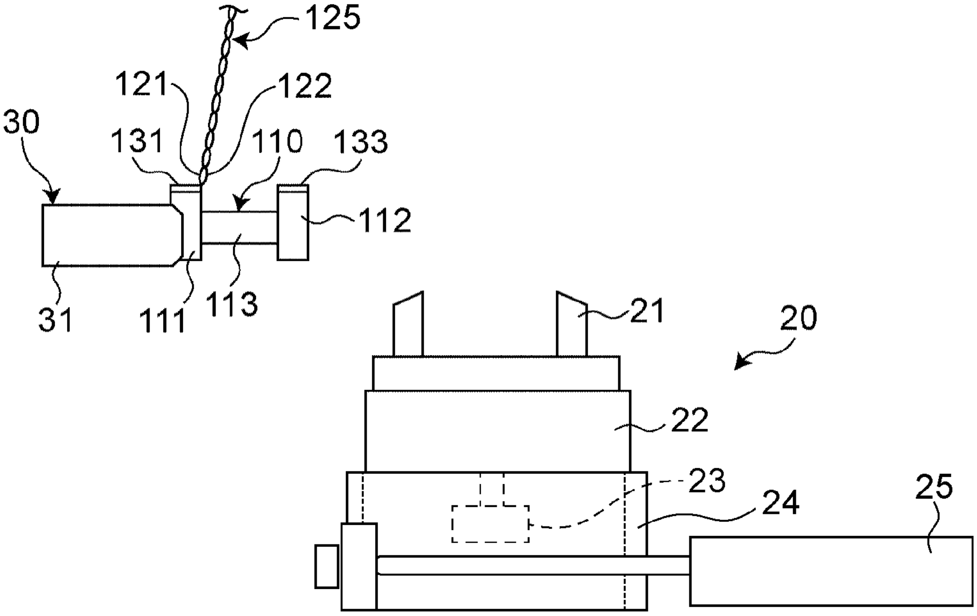
FIG. 5F is an explanatory view for explaining a coil component manufacturing method.

Thereafter, as illustrated in FIG. 5E, the rod of the first cylinder 25 is extended to bring the twisting chuck portion 21 close to the winding chuck portion 31 together with the rotation table 22 and the support table 24, that is, the twisting chuck portion 21 is moved to the second position illustrated in FIG. 5B, and the core 110 held by the twisting chuck portion 21 is moved to the winding chuck portion 31 as illustrated in FIG. 5F. Then, the rod of the first cylinder 25 is retracted to separate the twisting chuck portion 21 from the winding chuck portion 31 together with the rotation table 22 and the support table 24. In addition, the rod of the second cylinder 27 illustrated in FIG. 1 is retracted to separate the twisting chuck portion 21 from the winding chuck portion 31 together with the rotation table 22, the support table 24, and the base 26. That is, the twisting chuck portion 21 is moved to the first position illustrated in FIG. 5A.

Figure 5G:
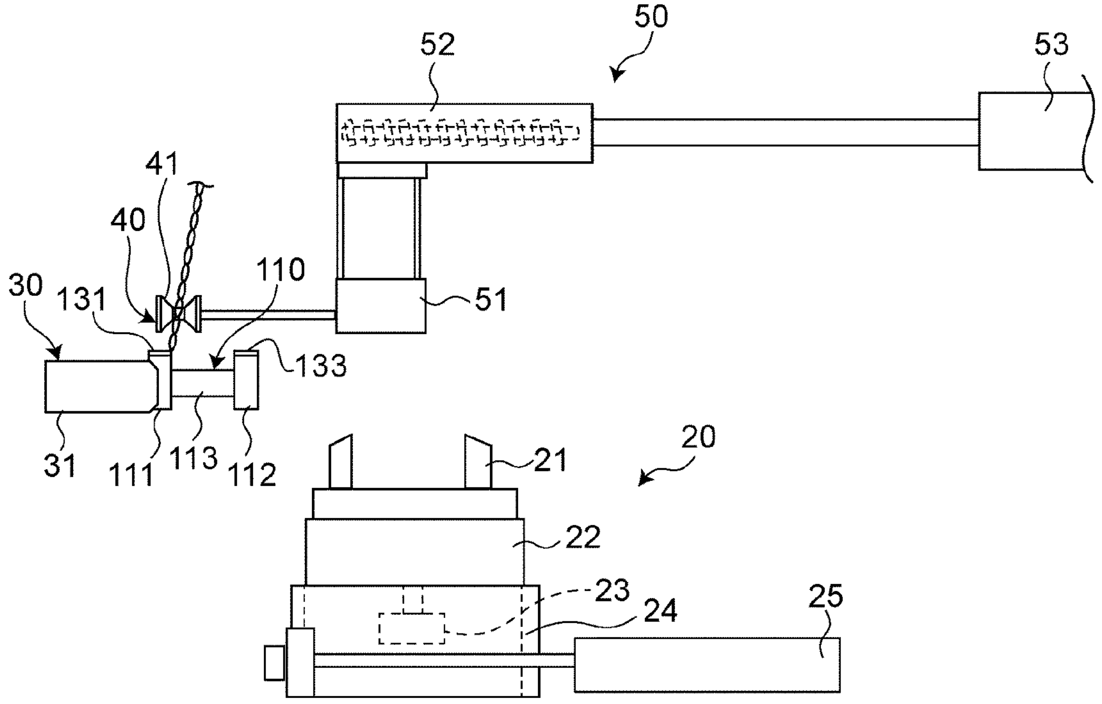
FIG. 5G is an explanatory view for explaining a coil component manufacturing method.

Thereafter, as illustrated in FIG. 5G, the rod of the cylinder 53 is extended to bring the guide member 40 close to the winding chuck portion 31 together with the guide support portion 51 and the guide position adjusting portion 52. At this time, the guide member 40 is brought close to the core 110 held by the winding chuck portion 31, and the twisted portion 125 is accommodated and laid in the groove 41 of the guide member 40.

Figure 5H:
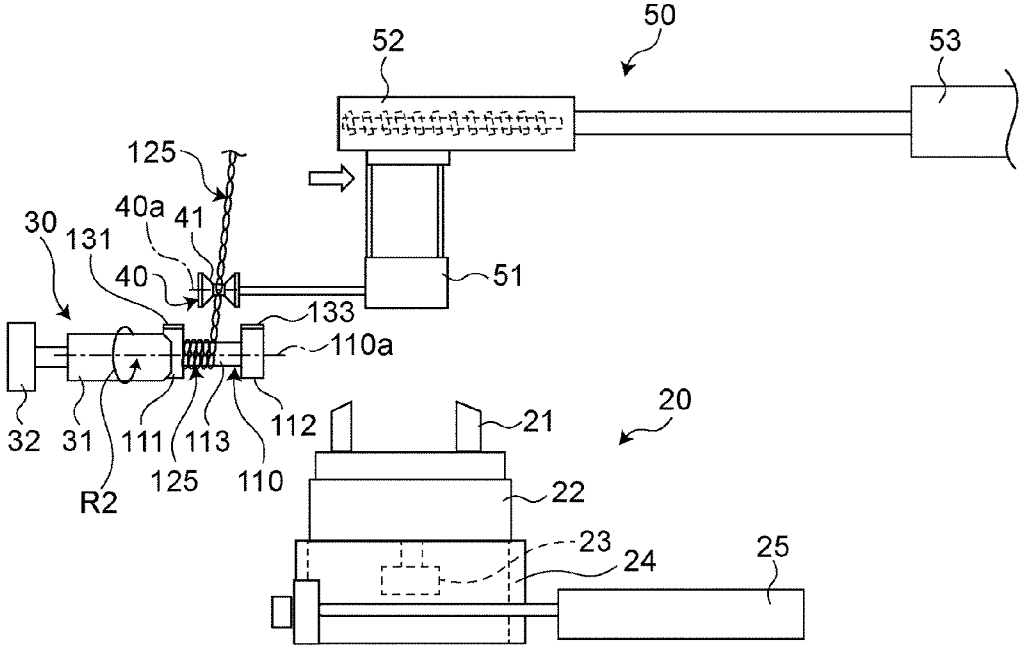
FIG. 5H is an explanatory view for explaining a coil component manufacturing method.

Then, as illustrated in FIG. 5H, the nozzle 10 and the core 110 are relatively rotated in a direction of winding the twisted portion 125 around the core 110, and the twisted portion 125 is wound around the core 110 while being guided to a predetermined position of the core 110 by the guide member 40 positioned closer to the core 110 than the nozzle 10. Specifically, the nozzle 10 is fixed, the winding chuck portion 31 is rotated about the horizontal axis when the motor 32 is driven, and the core 110 held by the winding chuck portion 31 is rotated in the R2 direction about the axis 110*a* of the core 110.

As a result, since the twisted portion 125 is wound around the core 110 while being guided to a predetermined position of the core 110 by the guide member 40 positioned closer to the core 110 than the nozzle 10, the twisted portion 125 can be guided to the core 110 at a position close to the core 110, and as a result, the twisted portion 125 can be wound at a desired position of the core 110. In addition, since the twisted portion 125 is wound around the core 110 while traveling in the groove 41 of the guide member 40, the twisted portion 125 is hardly displaced, and can be wound at a more accurate position.

Preferably, when the twisted portion 125 is wound around the core 110, the distance between the guide member 40 and the core 110 is made shorter than the distance between the nozzle 10 and the guide member 40, so that the twisted portion 125 can be wound at a more accurate position.

When the twisted portion 125 is wound around the core 110, the twisted portion 125 is guided to a predetermined position of the core 110 while the guide member 40 is rotated about the axis 40*a* of the guide member 40. This can reduce the resistance of the guide member 40 to the twisted portion 125 and more smoothly guide the twisted portion 125 to the core 110. For example, this can reduce friction on the wires 121, 122 by the guide member 40 and suppress disconnection of the wires 121, 122.

When the twisted portion 125 is wound around the core 110, the guide member 40 is moved in the direction of the axis 110*a* of the core 110 to guide the twisted portion 125 to a predetermined position of the core 110. Specifically, the guide member 40 is moved from the first flange portion 111 to the second flange portion 112 along the axis 110*a* of the core 110 together with the guide support portion 51 when the guide position adjusting portion 52 is driven. This can wind the twisted portion 125 around the core 110 while moving the guide member 40 to align with a desired position of the core 110. This can further improve the positional accuracy of winding of the twisted portion 125 around the core 110.

Thereafter, the terminal end of the first wire 121 is connected to the third external electrode 133 of the core 110, and the terminal end of the second wire 122 is connected to the fourth external electrode 134 of the core 110, whereby the coil component 100 as illustrated in FIG. 2 is manufactured.

When the twist pitch of the twisted portion 125 of the coil component 100 is changed, the twist pitch of the twisted portion 125 can be changed by changing the rotation speed of the twisting chuck portion 21 when the nozzle 10 and the core 110 are relatively rotated to form the twisted portion 125.

Here, the twist pitch of the twisted portion 125 refers to a length from specific relative positions of the first wire 121 and the second wire 122 to the first return to the next same relative positions in a state where the first wire 121 and the second wire 122 are twisted with each other. That is, the twist pitch is a length when the positional relationship between the plurality of wires twisted with each other is rotated from 0° to 360°.

Second Embodiment

Figure 6:
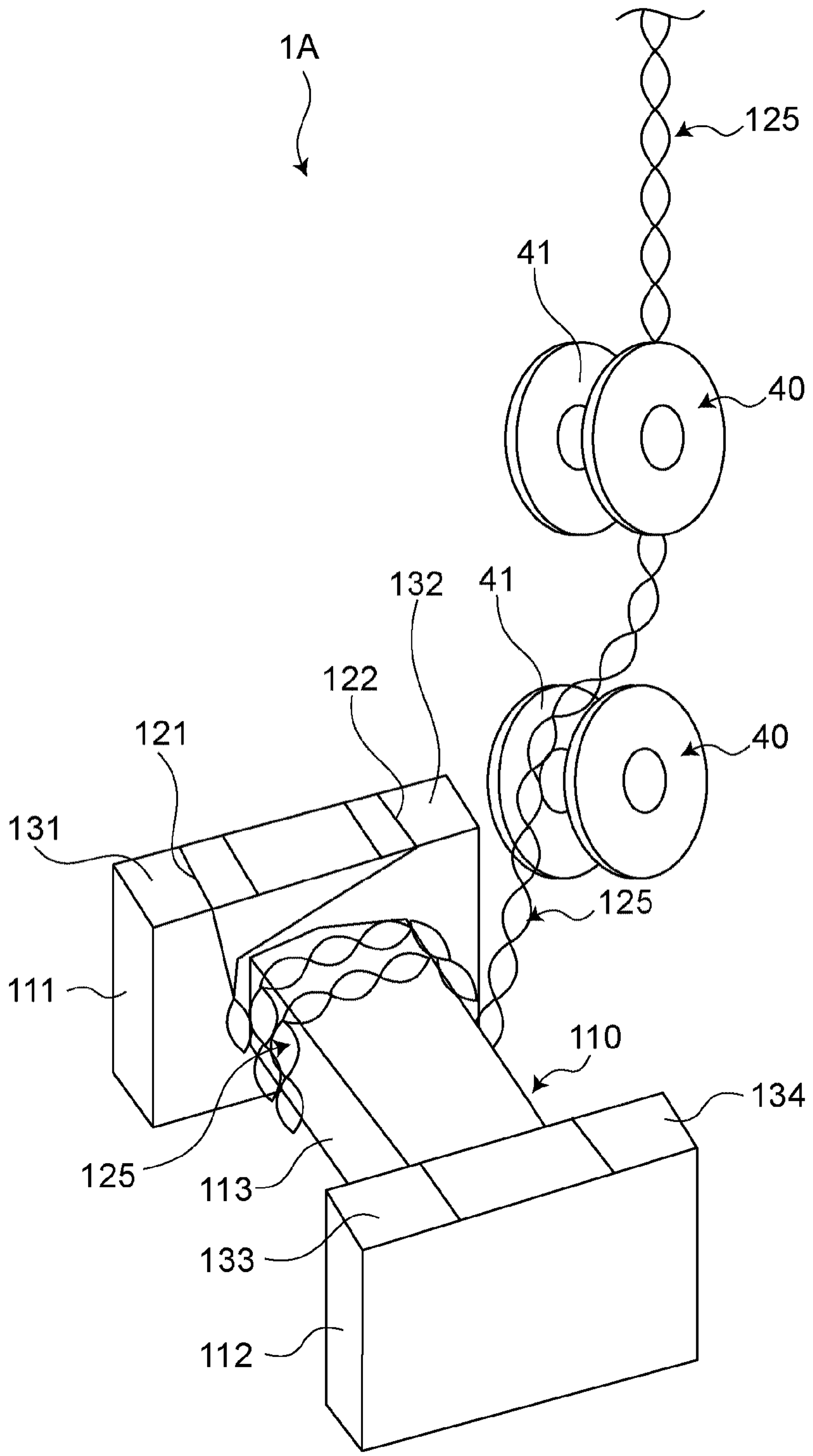
FIG. 6 is a simplified perspective view illustrating a second embodiment of the coil component manufacturing apparatus.

FIG. 6 is a simplified perspective view illustrating a second embodiment of the coil component manufacturing apparatus. The second embodiment is different from the first embodiment in the number of guide members. This different configuration will be described below. The other configurations are the same as those of the first embodiment and are denoted by the same reference numerals as those of the first embodiment, and the description thereof will be omitted.

As illustrated in FIG. 6, a coil component manufacturing apparatus 1A according to the second embodiment has two guide members 40. The two guide members 40 are positioned on opposite sides of the twisted portion 125 when the twisted portion 125 is wound around the core 110 and is capable of guiding the twisted portion 125 to a predetermined position of the core 110. Specifically, the two guide members 40 are positioned on opposite sides of the twisted portion 125 and are disposed vertically along the twisted portion 125. The twisted portion 125 travels in the groove 41 of each of the two guide members 40.

According to the above configuration, since the two guide members 40 guide the twisted portion 125 to a predetermined position of the core 110 while sandwiching the twisted portion in the groove 41, the positional accuracy of the winding of the twisted portion 125 with respect to the core 110 can be further improved.

Next, a second embodiment of the coil component manufacturing method will be described. In the first embodiment, the twisted portion 125 is wound around the core 110 using one guide member 40, but the second embodiment is different in that the twisted portion 125 is wound around the core 110 using two guide members 40. Since the other steps are the same as those of the first embodiment, the description thereof will be omitted.

That is, in the step of winding the twisted portion 125 around the core 110, the twisted portion 125 is guided to a predetermined position of the core 110 by the two guide members 40 positioned on opposite sides of the twisted portion 125. This can further improve the positional accuracy of winding of the twisted portion 125 around the core 110.

In the second embodiment, there are two guide members 40, and there may be three or more guide members. In such a case, the plurality of guide members 40 may be disposed along the twisted portion 125 and may be positioned alternately on opposite sides of the twisted portion 125.

Third Embodiment

Figure 7:
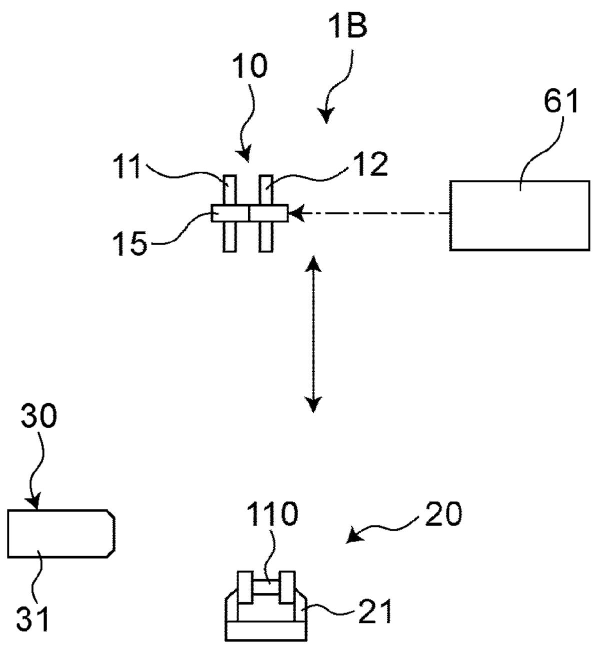
FIG. 7 is a simplified configuration diagram illustrating a third embodiment of the coil component manufacturing apparatus.

FIG. 7 is a simplified configuration diagram illustrating a third embodiment of the coil component manufacturing apparatus. The third embodiment is different from the first embodiment in that a nozzle height adjustment mechanism is provided. This different configuration will be described below. The other configurations are the same as those of the first embodiment and are denoted by the same reference numerals as those of the first embodiment, and the description thereof will be omitted.

As illustrated in FIG. 7, a coil component manufacturing apparatus 1B according to the third embodiment further includes a nozzle height adjustment mechanism 61 that can relatively adjust the distance between the nozzle 10 and the core 110. That is, the nozzle height adjustment mechanism 61 is capable of relatively adjusting the distance between the nozzle 10 and the wire twisting mechanism 20. In this embodiment, the nozzle height adjustment mechanism 61 enables the nozzle 10 to approach or separate from the twisting chuck portion 21 as indicated by an arrow in FIG. 7. Specifically, the nozzle 10 moves downward and approaches the core 110 held by the twisting chuck portion 21, and the nozzle 10 moves upward and separates from the core 110 held by the twisting chuck portion 21.

The nozzle height adjustment mechanism may allow the twisting chuck portion 21 to approach or separate from the nozzle 10, or the nozzle height adjustment mechanism may allow the nozzle 10 and the twisting chuck portion 21 to approach or separate from each other.

According to the above configuration, when the twisted portion 125 is formed, the distance between the nozzle 10 and the core 110 can be adjusted according to the size of the product. In addition, the twist pitch of the twisted portion 125 can be adjusted by adjusting the distance between the nozzle 10 and the core 110 when the twisted portion 125 is formed. Specifically, when the distance between the nozzle 10 and the core 110 increases, the twist pitch increases, and when the distance between the nozzle 10 and the core 110 decreases, the twist pitch decreases.

At the same time, the nozzle height adjustment mechanism 61 is capable of relatively adjusting the distance between the nozzle 10 and the wire winding mechanism 30. In this embodiment, the nozzle height adjustment mechanism 61 enables the nozzle 10 to approach or separate from the winding chuck portion 31. Specifically, the nozzle 10 moves downward and approaches the core 110 held by the winding chuck portion 31, and the nozzle 10 moves upward and separates from the core 110 held by the winding chuck portion 31.

The nozzle height adjustment mechanism may allow the winding chuck portion 31 to approach or separate from the nozzle 10, or the nozzle height adjustment mechanism may allow the nozzle 10 and the winding chuck portion 31 to approach or separate from each other.

According to the above configuration, when the twisted portion 125 is wound around the core 110, the distance between the nozzle 10 and the core 110 can be adjusted according to the size of the product.

Next, a third embodiment of the coil component manufacturing method will be described. In the first embodiment, the distance between the nozzle 10 and the core 110 is kept constant in the step of forming the twisted portion 125 and the step of winding the twisted portion 125, but the third embodiment is different in that the distance between the nozzle 10 and the core 110 is varied. Since the other steps are the same as those of the first embodiment, the description thereof will be omitted.

That is, the distance between the nozzle 10 and the core 110 is relatively adjusted in at least one of the step of forming the twisted portion 125 or the step of winding the twisted portion 125 around the core 110. This can adjust the distance between the nozzle 10 and the core 110 in accordance with the size of the product in at least one of the step of forming the twisted portion 125 or the step of winding the twisted portion 125 around the core 110. In addition, the twist pitch of the twisted portion 125 can be adjusted by adjusting the distance between the nozzle 10 and the core 110 in the step of forming the twisted portion 125.

The nozzle height adjustment mechanism may be capable of relatively adjusting either the distance between the nozzle and the wire twisting mechanism or the distance between the nozzle and the wire winding mechanism.

Fourth Embodiment

Figure 8:
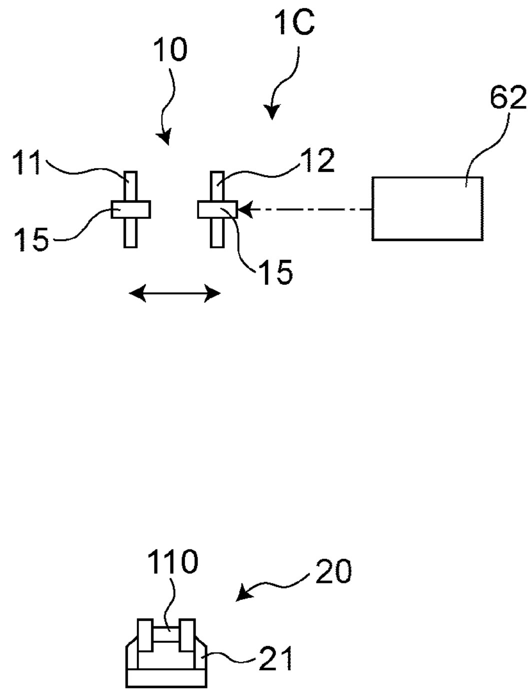
FIG. 8 is a simplified configuration diagram illustrating a fourth embodiment of the coil component manufacturing apparatus.

FIG. 8 is a simplified configuration diagram illustrating a fourth embodiment of the coil component manufacturing apparatus. The fourth embodiment is different from the first embodiment in that an inter-nozzle distance adjustment mechanism is provided. This different configuration will be described below. The other configurations are the same as those of the first embodiment and are denoted by the same reference numerals as those of the first embodiment, and the description thereof will be omitted.

As illustrated in FIG. 8, in a coil component manufacturing apparatus 1C of the fourth embodiment, the nozzle 10 is configured such that the first nozzle portion 11 and the second nozzle portion 12 can approach or separate from each other. The coil component manufacturing apparatus 1C further includes an inter-nozzle distance adjustment mechanism 62 that is capable of adjusting the distance between the first nozzle portion 11 and the second nozzle portion 12. In this embodiment, the inter-nozzle distance adjustment mechanism 62 moves the first nozzle portion 11 and the second nozzle portion 12 in the horizontal direction as indicated by an arrow in FIG. 8. That is, the inter-nozzle distance adjustment mechanism 62 brings the first nozzle portion 11 and the second nozzle portion 12 close to or away from each other. The inter-nozzle distance adjustment mechanism 62 may be configured to move either the first nozzle portion 11 or the second nozzle portion 12.

According to the above configuration, when the twisted portion 125 is formed, the twist pitch of the twisted portion 125 can be adjusted by adjusting the distance between the first nozzle portion 11 and the second nozzle portion 12. Specifically, when the distance between the first nozzle portion 11 and the second nozzle portion 12 increases, the twist pitch decreases, and when the distance between the first nozzle portion 11 and the second nozzle portion 12 decreases, the twist pitch increases.

Next, a fourth embodiment of the coil component manufacturing method will be described. In the first embodiment, the distance between the first nozzle portion 11 and the second nozzle portion 12 is made constant in the step of forming the twisted portion 125, but the fourth embodiment is different in that the distance between the first nozzle portion 11 and the second nozzle portion 12 is varied. Since the other steps are the same as those of the first embodiment, the description thereof will be omitted.

That is, in the step of forming the twisted portion 125, the distance between the first nozzle portion 11 and the second nozzle portion 12 is adjusted. As a result, in the step of forming the twisted portion 125, the twist pitch of the twisted portion 125 can be adjusted by adjusting the distance between the first nozzle portion 11 and the second nozzle portion 12.

Note that the present disclosure is not limited to the above-described embodiments and can be modified in design without departing from the gist of the present disclosure. For example, the respective feature points of the first to fourth embodiments may be variously combined.

In the embodiments, the coil component is used as a common mode choke coil, but for example, the coil component may be used as a winding-type coil in which a plurality of wires are wound around a winding core portion such as a transformer and a coupling inductor array. For these winding-type coils as well, reduction of the line-to-line capacitance is useful.

In the embodiments, the coil includes two wires, but it is sufficient that the coil includes a plurality of wires, and may include three or more wires. In such a case, the twisted portion is not limited to a configuration in which two wires are twisted and may have a configuration in which three or more wires are twisted. When the number of wires is three or more, the number of nozzle portions is three or more, and the three wires are capable of being respectively inserted through the three nozzle portions.

In the embodiments, the guide driving mechanism has a cylinder, but the cylinder may be omitted and only the guide position adjusting portion may be provided. Although the guide driving mechanism is provided in the embodiments, the guide driving mechanism does not have to be provided.

In the embodiments, the nozzle has the first nozzle portion through which the first wire is inserted and the second nozzle portion through which the second wire is inserted. However, the nozzle may have one nozzle portion, and a plurality of wires may be inserted through the one nozzle portion.

In the embodiments, when the twisted portion is formed, the nozzle is fixed and the twisting chuck portion is rotated, but the nozzle may be rotated and the twisting chuck portion may be fixed, or the nozzle and the twisting chuck portion may be rotated in the same direction or in opposite directions.

In the embodiments, when the twisted portion is wound, the nozzle is fixed and the winding chuck portion is rotated, but the nozzle may be rotated and the winding chuck portion may be fixed, or the nozzle and the winding chuck portion may be rotated in the same direction or in opposite directions.

In the embodiments, the twisted portion is collectively formed and then collectively wound around the core, but the twisted portion may be formed in a plurality of times and then wound around the core. That is, a predetermined number of twisted portions may be formed and then wound around the core, and thereafter a predetermined number of twisted portions may be formed again and then wound around the core.

What is claimed is:

1. A coil component manufacturing apparatus comprising:
- a nozzle configured to receive a plurality of wires;
- a wire twisting mechanism configured to hold a core, rotate the core-relative to the nozzle in a direction of twisting the plurality of wires, and form a twisted portion in which the plurality of wires are twisted between the nozzle and the core;
- a wire winding mechanism configured to hold the core, rotate the core relative to the nozzle in a direction of winding the twisted portion around the core, and wind the twisted portion around the core; and
- a guide positioned closer to the core than the nozzle, the guide being configured to guide the twisted portion to a predetermined position of the core when the twisted portion is wound around the core.

2. The coil component manufacturing apparatus according to claim 1, wherein
- the guide is positioned between the nozzle and the core when the twisted portion is wound around the core.

3. The coil component manufacturing apparatus according to claim 2, wherein
- the guide has a groove having a V-shaped section through which the twisted portion passes.

4. The coil component manufacturing apparatus according to claim 2, further comprising:
- a guide driving mechanism that is configured to move the guide in an axial direction of the core when the twisted portion is wound along the axial direction of the core.

5. The coil component manufacturing apparatus according to claim 1, wherein
- the guide has a groove having a V-shaped section through which the twisted portion passes.

6. The coil component manufacturing apparatus according to claim 5, wherein
- the guide has a cylindrical body, and the groove extends in a circumferential direction on a side face of the cylindrical body.

7. The coil component manufacturing apparatus according to claim 6, wherein
- the guide is rotatably held about an axis of the cylindrical body.

8. The coil component manufacturing apparatus according to claim 1, further comprising:
- a guide driving mechanism that is configured to move the guide in an axial direction of the core when the twisted portion is wound along the axial direction of the core.

9. The coil component manufacturing apparatus according to claim 1, wherein
- the guide includes two guides, and
- the two guides are positioned on opposite sides of the twisted portion when the twisted portion is wound around the core, and are configured to guide the twisted portion to a predetermined position of the core.

10. The coil component manufacturing apparatus according to claim 1, further comprising:
- a nozzle height adjustment mechanism that is configured to relatively adjust a distance between the nozzle and the core.

11. The coil component manufacturing apparatus according to claim 1, wherein
- the nozzle includes a plurality of nozzle portions through which the plurality of wires are to be inserted respectively, and
- the apparatus further includes an inter-nozzle distance adjustment mechanism that is configured to adjust a distance between the plurality of nozzle portions.

12. A coil component manufacturing method comprising:
- passing a plurality of wires through a nozzle to connect starting ends of the plurality of wires to an external electrode of a core;
- rotating the core in a direction of twisting the plurality of wires and forming a twisted portion in which the plurality of wires are twisted between the nozzle and the core; and
- relatively rotating the nozzle and the core in a direction of winding the twisted portion around the core, and winding the twisted portion around the core while guiding the twisted portion to a predetermined position of the core with a guide positioned closer to the core than the nozzle.

13. The coil component manufacturing method according to claim 12, wherein
- in the winding of the twisted portion around the core, the twisted portion is guided to the predetermined position of the core while the guide is rotated about an axis of the guide.

14. The coil component manufacturing method according to claim 13, wherein
- in the winding of the twisted portion around the core, the guide is moved in an axial direction of the core to guide the twisted portion to the predetermined position of the core.

15. The coil component manufacturing method according to claim 13, wherein
- the guide includes two guides, and
- in the winding of the twisted portion around the core, the twisted portion is guided to the predetermined position of the core with the two guides positioned on opposite sides of the twisted portion.

16. The coil component manufacturing method according to claim 12, wherein in the winding of the twisted portion around the core, the guide is moved in an axial direction of the core to guide the twisted portion to the predetermined position of the core.

17. The coil component manufacturing method according to claim 12, wherein the guide includes two guides, and in the winding of the twisted portion around the core, the twisted portion is guided to the predetermined position of the core with the two guides positioned on opposite sides of the twisted portion.

18. The coil component manufacturing method according to claim 12, wherein a distance between the nozzle and the core is relatively adjusted in at least one of the forming of the twisted portion or the winding of the twisted portion around the core.

19. The coil component manufacturing method according to claim 12, wherein the nozzle includes a plurality of nozzle portions through which the plurality of wires are to be inserted respectively, and in the forming of the twisted portion, a distance between the plurality of nozzle portions is adjusted.

20. A coil component manufacturing apparatus comprising:

a nozzle configured to receive a plurality of wires;

a first chuck configured to hold a core, rotate the core in a direction of twisting the plurality of wires, and form a twisted portion in which the plurality of wires are twisted between the nozzle and the core;

a second chuck configured to hold the core, rotate the core relative to the nozzle in a direction of winding the twisted portion around the core, and wind the twisted portion around the core; and a guide positioned closer to the core than the nozzle, the guide being configured to guide the twisted portion to a predetermined position of the core when the twisted portion is wound around the core.

* * * * *